(12) United States Patent
Wang

(10) Patent No.: US 8,126,493 B2
(45) Date of Patent: Feb. 28, 2012

(54) METHOD AND POC GATEWAY FOR IMPLEMENTING POC SERVICE

(75) Inventor: Jinliang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 299 days.

(21) Appl. No.: 12/689,735

(22) Filed: Jan. 19, 2010

(65) Prior Publication Data

US 2010/0120463 A1     May 13, 2010

Related U.S. Application Data

(63) Continuation of application No. PCT/CN2008/071678, filed on Jul. 17, 2008.

(30) Foreign Application Priority Data

Jul. 18, 2007   (CN) .......................... 2007 1 0130362

(51) Int. Cl.
     *H04Q 7/20*      (2006.01)

(52) U.S. Cl. ........ 455/518; 455/519; 455/500; 455/517; 455/509; 455/414.1; 370/401; 370/328; 370/329; 370/260; 370/261

(58) Field of Classification Search .................. 455/518, 455/519, 500, 517, 466, 416, 403, 422.1, 455/414.1–414.4, 445, 550.1, 516, 507, 509, 455/511, 435.1, 435.2; 370/328, 329, 261, 370/262, 260, 401, 343

See application file for complete search history.

(56) References Cited

U.S. PATENT DOCUMENTS

2006/0072526 A1   4/2006   Rasanen
2006/0148504 A1   7/2006   Kim
2007/0165653 A1*   7/2007   Wiatrak et al. ................. 370/401
2008/0171533 A1*   7/2008   Sharp et al. .................... 455/410

FOREIGN PATENT DOCUMENTS

CN      1372207 A      10/2002
(Continued)

OTHER PUBLICATIONS

Written Opinion of the International Searching Authority issued in corresponding PCT Patent Application No. PCT/CN2008/071678, mailed Oct. 30, 2008.
Communication issued in corresponding European Patent Application No. 08783706.8, mailed Jul. 26, 2010.
Communication issued in corresponding European Patent Application No. 08783706.8, mailed Apr. 13, 2011.

(Continued)

*Primary Examiner* — Keith Ferguson
(74) *Attorney, Agent, or Firm* — Brinks Hofer Gilson & Lione

(57) ABSTRACT

The present disclosure discloses a method for implementing a Push to talk over Cellular (PoC) service and a PoC gateway so as to shorten the process for a terminal to implement a PoC service. The method includes: receiving a request from a first terminal for setup of a session with a second terminal; sending a registration request to an IP Multimedia Subsystem (IMS) core network after receiving the session setup request; receiving a registration success response from the IMS core and sending the session setup request to a PoC server, which forwards the request to the second terminal; receiving a session setup success response from the second terminal via the PoC server; and sending the session setup success response to the first terminal. The present disclosure also discloses a PoC gateway. With the present disclosure, the application of the PoC service will be wider.

13 Claims, 4 Drawing Sheets

FOREIGN PATENT DOCUMENTS

| | | |
|---|---|---|
| CN | 1770911 A | 5/2006 |
| CN | 1798375 A | 7/2006 |
| CN | 1852491 A | 10/2006 |
| CN | 1859636 A | 11/2006 |
| CN | 101094478 A | 12/2007 |
| CN | 100584068 C | 1/2010 |
| EP | 1788764 A1 | 5/2007 |
| WO | WO 2006002869 A1 | 1/2006 |
| WO | WO 2006047951 A1 | 5/2006 |
| WO | 2007/037644 A1 | 4/2007 |
| WO | WO 2007069942 A1 | 6/2007 |

OTHER PUBLICATIONS

Open Mobile Alliance, "OMA PoC System Description" OMA-TS-PoC-System-Description-V2_0-20060524-D, Draft Version 2.0, May 24, 2006.

Open Mobile Alliance, "Push to Talk over Cellular 2 Requirements" OMA-RD-PoC-V2_0-20060820-D. Draft Version 2.0, Aug. 20, 2006.

International Search Report Issued in corresponding PCT Application No. PCT/CN2008/071678; mailed Oct. 30, 2008.

* cited by examiner

METHOD AND POC GATEWAY FOR IMPLEMENTING POC SERVICE

CROSS-REFERENCE TO RELATED APPLICATIONS

This application is a continuation of International Application No. PCT/CN2008/071678, filed on Jul. 17, 2008, which claims priority to Chinese Patent Application No. 200710130362.2, filed on Jul. 18, 2007, both of which are hereby incorporated by reference in their entireties.

FIELD

The present disclosure relates to communications, and in particular, to a method and a Push to talk over Cellular (PoC) gateway for implementing the PoC service.

BACKGROUND

PoC service is a half-duplex point-to-point or point-to-multipoint speech service based on a mobile network. In a PoC service, a user can start a conversation with the peer end by one keystroke and set up voice and data connections to realize point-to-point or flexible group communications.

PoC service is implemented on the basis of an IP Multimedia Subsystem (IMS) architecture. A terminal that requests PoC service originates a PoC service request to a PoC server. The PoC server controls the rights of joining the conversation, replicates and distributes data packets, and controls point-to-point and point-to-multipoint call; the IMS core provides main functions of an IMS system, including PoC user registration and routing of Session Initiation Protocol (SIP) messages. Routing and triggering of the PoC service are completed in IMS core network elements.

When a terminal communicates via an IMS core network and a PoC server, it must interact with the IMS core network and the PoC server separately when requesting setup of a session. The terminal must go through a complex process when using the PoC service. This gives a bad experience to end users and hinders the applications of the PoC service.

SUMMARY

The purpose of the present disclosure is to provide a method and a PoC gateway for implementing the PoC service so as to reduce the interaction between a terminal and a PoC server when the terminal requests a PoC service.

For the above purpose, the present disclosure provides the following embodiments.

A method for implementing the PoC service includes: receiving, by a PoC gateway, a session setup request from a first terminal for setup of a session with a second terminal; sending, by the PoC gateway, a registration request to an IMS core after receiving the session setup request from the first terminal; sending, by the PoC gateway after receiving a registration success response returned by the IMS core, the session setup request via the IMS core to a PoC server, which forwards the session setup request to the second terminal; receiving, by the PoC gateway, a session setup success response from the second terminal via the PoC server; and sending, by the PoC gateway, the session setup success response to the first terminal.

A PoC gateway includes a session setup request receiving unit, a registration requesting unit, a registration success response receiving unit, a session setup request sending unit, and a session setup success response sending unit. The session setup request receiving unit is configured to receive a request from a first terminal for setup of a session with a second terminal. The registration requesting unit, configured to send a registration request to an IMS core with an IMS user identity after the session setup request receiving unit receives the session setup request. The registration success response receiving unit, configured to receive a registration success response returned by the IMS core. The session setup request sending unit, configured to send the session setup request to a PoC server after the registration success response receiving unit receives the registration response from the IMS core. The session setup success response sending unit, configured to send a session setup success response sent by the PoC server via the IMS core to the first terminal after the session setup request sending unit sends the session setup request to the PoC server via the IMS core.

The first terminal sends the request for setup of a session with the second terminal to the PoC gateway, and the PoC gateway sends a registration request to the IMS core and forwards the session setup request to the PoC server so that the process of session setup with the second terminal continues while the interaction between the terminal and the PoC server is reduced. The solution gives a good user experience and facilitates the wider application of the PoC service.

DETAILED DESCRIPTION OF THE EMBODIMENTS

Embodiments of the present disclosure provide a method and a PoC gateway for implementing the PoC service so that terminals of various access modes get access to the PoC service.

A PoC gateway is adopted in an embodiment of the present disclosure. The PoC gateway provides an interface between a terminal and a PoC server and performs protocol adaptation so that terminals of various access modes get access to the PoC service. When an IMS core exists in a network, the PoC gateway provides an interface between the terminal and the IMS core and an interface between the terminal and the PoC server. The PoC gateway performs protocol adaptation to interact with the IMS core and access the PoC server so that terminals of various access modes get access to the PoC service via the IMS core.

Based on the above technical solution, in an exemplary embodiment of the present disclosure, an end user accesses the PoC service via the web. The present disclosure is not limited to terminals of the web access mode. Other access modes, such as fixed line access, are also covered by the present disclosure.

An embodiment of the present disclosure provides a method for implementing the PoC service where a PoC gateway assigns an IMS user identity before the PoC gateway receives a PoC call.

A first terminal calls a second terminal. Before the first terminal starts a PoC call, the first terminal sets up a connection with the PoC gateway. If the first terminal logs in the PoC gateway with a non-IMS user identity, the PoC gateway assigns a temporary IMS user identity to the first terminal; when an IMS core exists between the PoC gateway and a PoC server, the PoC gateway also requests the IMS core for a registration address of the IMS user identity assigned to the first terminal so as to assure that the IMS user identity is usable in the IMS core.

Figure 1:
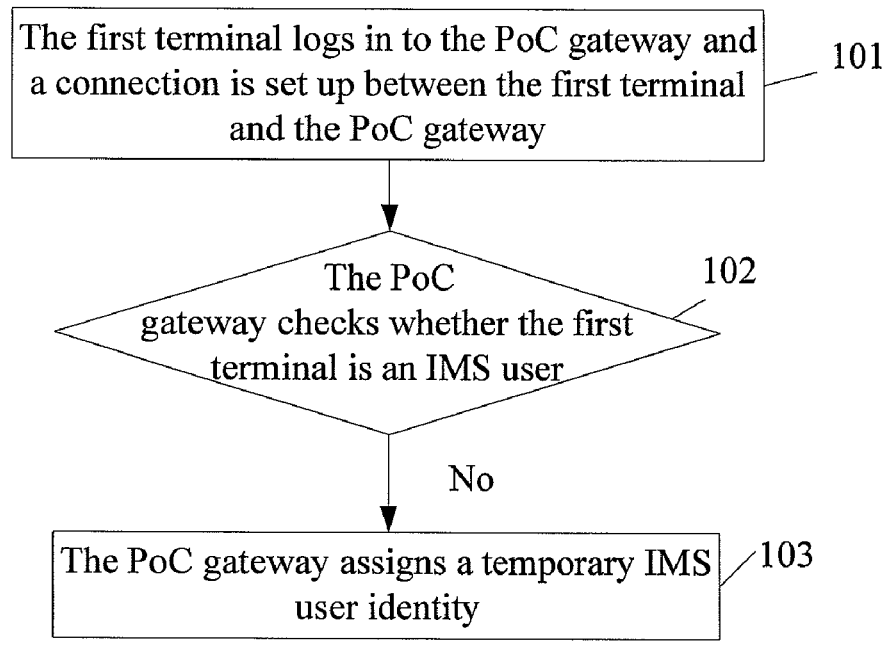
FIG. 1 shows a flowchart before a first terminal starts a PoC call according to an embodiment of the present disclosure.

FIG. 1 shows a specific process before the first terminal starts a PoC call in an embodiment of the present disclosure.

Step 101: The first terminal logs in the PoC gateway and a connection is set up between the first terminal and the PoC gateway.

Before the first terminal uses the PoC service, the first terminal opens a web page where a PoC service call is originated and then a Transmission Control Protocol (TCP) connection is set up between the terminal and a web portal (web interface). After the TCP connection between the web interface and the first terminal is set up, the web interface sends a TCP connection request to the PoC gateway to set up a TCP connection with the PoC gateway. Finally, a TCP connection is set up between the first terminal and the PoC gateway via the web interface.

Step 102: The PoC gateway checks whether the first terminal is an IMS user.

The PoC gateway authenticates the first terminal. If the first terminal logs in with a non-IMS user identity, the process proceeds to step 103, where the PoC gateway assigns a temporary IMS user identity to the first terminal; if the first terminal logs in with a registered IMS user identity, the PoC gateway need not assign an IMS user identity and the first terminal originates a PoC call with the registered IMS user identity. In this step, the PoC gateway guarantees that the first terminal has an IMS user identity. Because the PoC gateway assigns IMS user identities to terminals without an IMS user identity, terminals without an IMS user identity can also implement the PoC service. Thus, the application of the PoC service is broadened.

The PoC gateway sets up the connection between the first terminal and the PoC gateway to the IMS user identity of the first terminal and stores the connection for a certain period. The certain period can be configured by those skilled in the art and is generally 24 hours.

Step 103: The PoC gateway assigns an IMS user identity to the first terminal.

The PoC gateway assigns a temporary IMS user identity to the first terminal. The temporary IMS user identity is carried in a session setup request originated by the first terminal.

The first terminal logs in the PoC gateway. The PoC gateway assigns an IMS user identity to the first terminal. If the user originates a PoC call by a click on the PoC service page, the process proceeds to the following process.

Figure 2:
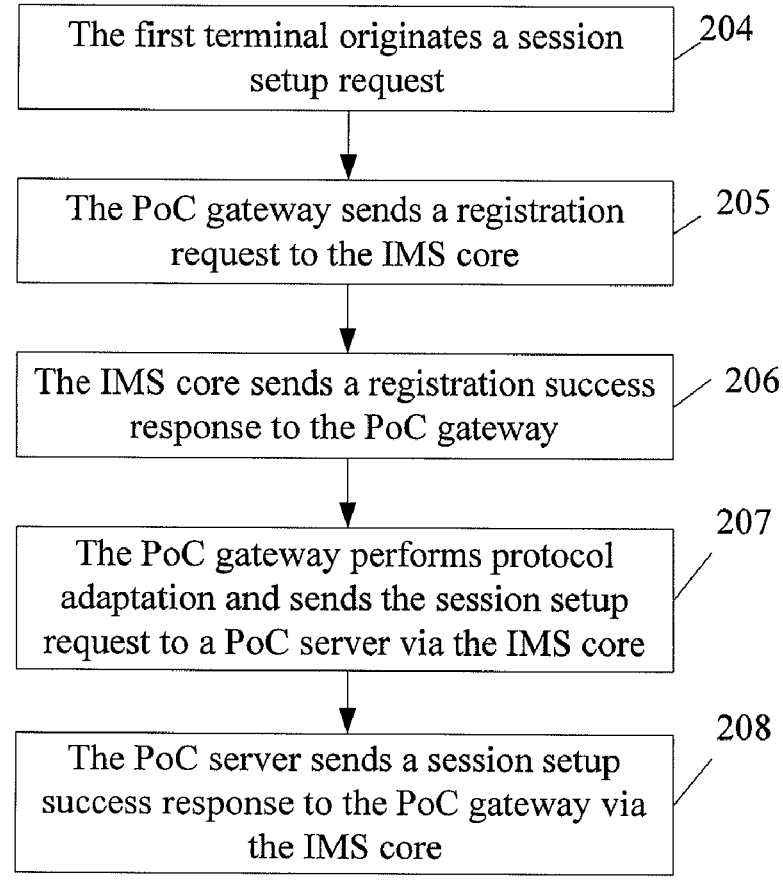
FIG. 2 shows a method for implementing the PoC service according to an embodiment of the present disclosure.

FIG. 2 shows a method for implementing the PoC service according to an embodiment of the present disclosure.

Step 204: The first terminal originates a session setup request.

The first terminal user enters a called number on the PoC service page and clicks to call a second terminal. The first terminal sends a request for setup of a session with the second terminal to the PoC gateway. Upon reception of the request, the PoC gateway executes step 205.

Step 205: The PoC gateway sends a registration request to an IMS core.

The PoC gateway sends a registration request to the IMS core with the IMS user identity carried in the session setup request originated by the first terminal. The IMS core provides a registration address for the IMS user identity requesting registration to assure that the IMS user identity is usable. The registration address of the IMS user identity will exist in the IMS core during the entire PoC service process and a certain surviving period after the call ends. The surviving period after the call ends is set in the IMS core. Those skilled in the art can set the period according to actual conditions. Usually, it is set to 24 hours.

Step 206: The IMS core sends a registration success response to the PoC gateway.

The IMS core returns a registration success response after it assigns a registration address for the IMS user identity sent by the PoC gateway.

Step 207: The PoC gateway performs protocol adaptation and sends the session setup request to a PoC server via the IMS core.

When the first terminal requesting the PoC service is an IMS terminal, the PoC gateway need not perform protocol adaptation but sends the request to the PoC server via the IMS core. When the first terminal requesting the PoC service is a non-IMS terminal, the session setup request originated by the first terminal is not based on SIP and the PoC gateway performs protocol adaptation for the request. For example, the PoC gateway may convert the session setup request originated by the first terminal into a SIP request and send a SIP based session setup request to the PoC server via the IMS core. The session setup request carries numbers of the first terminal and the second terminal. The number of the first terminal is its IMS user identity or the temporary IMS user identity assigned by the PoC gateway. The PoC gateway sends the session setup request to the IMS core and the IMS core forwards the request to the PoC server. Because the PoC gateway performs protocol adaptation on session setup requests sent by non-IMS terminals, it is convenient for terminals of various access modes to get access to the PoC service.

Step 208: The PoC server sends a session setup success response to the PoC gateway via the IMS core.

Upon reception of the session setup request from the IMS core, the PoC server delivers the session setup request to the second terminal. After the second terminal agrees to accept the session setup request, the PoC server returns a session setup success response to the IMS core and the IMS core forwards the response to the PoC gateway. Upon reception of the session setup success response from the PoC server, the PoC gateway responds to the first terminal with a call result indicating that the callee is successfully connected.

Now a PoC service connection is set up between the first terminal and the second terminal, and the first terminal and the second terminal can start a voice conversation or other data exchange.

After a session is successfully set up, the first terminal and the second terminal start information interaction. If the first terminal is a non-IMS terminal, such as a web terminal, the first terminal sends a media stream based on TCP to the PoC gateway; the PoC gateway converts the TCP media stream into a Real-time Transport Protocol (RTP) or Real-time Transport Control Protocol (RTCP) media stream and sends the converted media stream to the second terminal; the second terminal sends an RTP/RTCP based media stream to the first terminal; the PoC gateway converts the RTP/RTCP based media stream into a TCP based media stream and delivers the converted media stream to the first terminal.

In a word, the PoC gateway converts the format of media streams so that a media stream from the first terminal is converted into a media stream receivable to the second terminal and a media stream from the second terminal is converted into a media stream receivable to the first terminal. Information interaction between the first terminal and second terminal is thus achieved. For example, when a fixed line terminal accesses a PoC service, the PoC gateway converts the media format supported by the fixed line into an RTP/RTCP based media stream and converts an RTP/RTCP based media stream into a media format supported by the fixed line.

During the entire process from start of the session to end of the session, the PoC gateway records the originating terminal number, number of the called terminal, and the start time and end time of the session so that it is convenient to search call history records and perform charging on the PoC gateway accordingly.

In another embodiment of the present disclosure, the first terminal originates a request for setup of a session with the second terminal to the PoC gateway. Upon reception of the request from the first terminal, the PoC gateway checks whether the first terminal is an IMS user; if the first terminal is not an IMS user, the PoC gateway assigns an IMS user identity to the first terminal and sends a registration request to the IMS core with the IMS user identity so that subsequent steps of a session setup process are executed.

An embodiment of the present disclosure provides a method for implementing the PoC service where a PoC gateway assigns an IMS user identity after the PoC gateway receives a PoC call.

Figure 3:
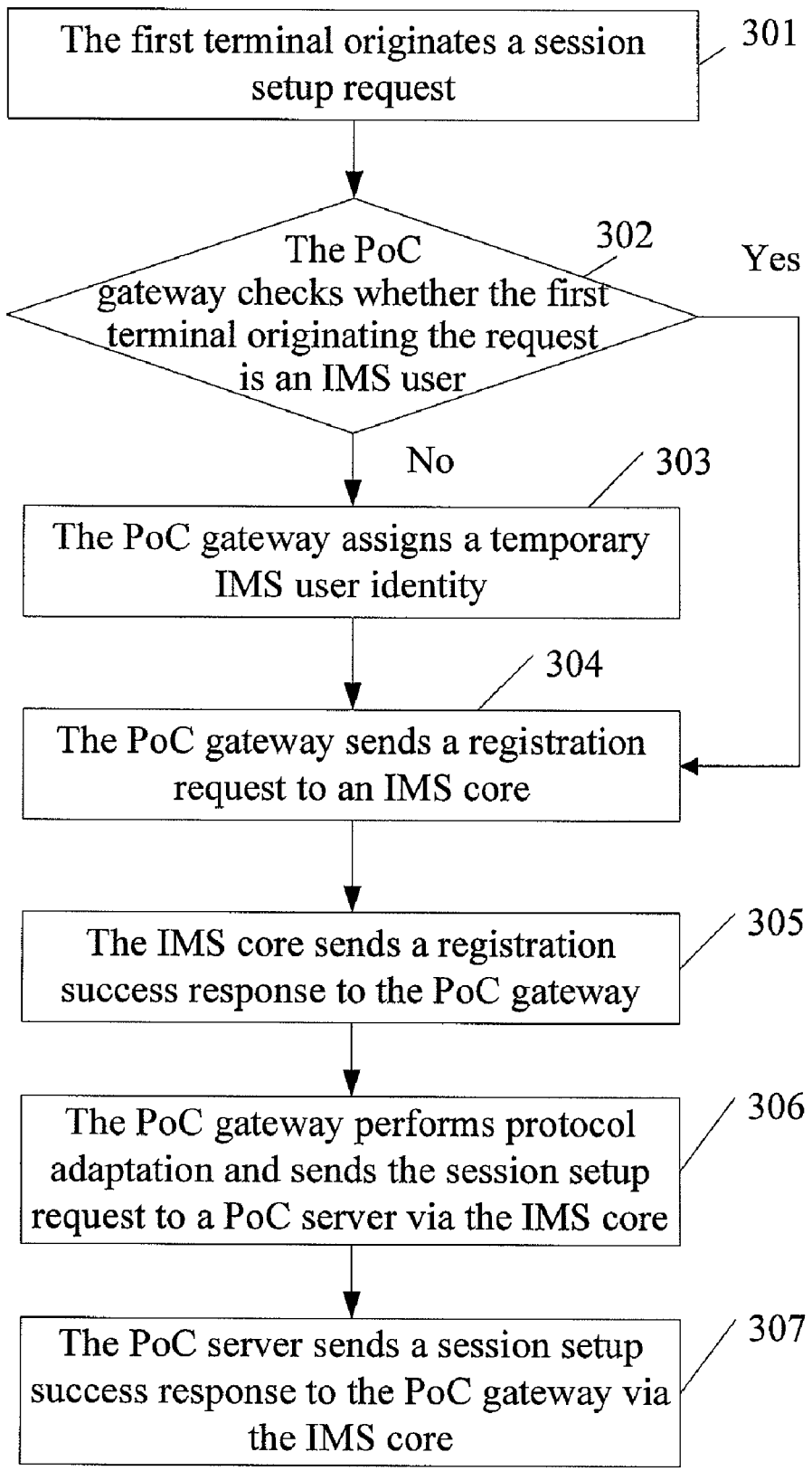
FIG. 3 shows a method for implementing the PoC service according to another embodiment of the present disclosure.

FIG. 3 shows the method for implementing the PoC service provided according to the embodiment of the present disclosure.

Step 301: The first terminal originates a session setup request.

The first terminal user enters a called number on the PoC service page and clicks to call a second terminal. The first terminal sends a request for setup of a session with the second terminal to the PoC gateway. Upon reception of the session setup request, the PoC gateway executes step 302.

Step 302: The PoC gateway checks whether the first terminal originating the session setup request is an IMS user.

The PoC gateway authenticates the first terminal. If the first terminal is a non-IMS user, the process proceeds to step 303, where the PoC gateway assigns a temporary IMS user identity to the first terminal. If the first terminal originating the session setup request uses a registered IMS user identity, the PoC gateway need not assign an IMS user identity to the first terminal but continues with step 304. In this step, the PoC gateway guarantees that the first terminal has an IMS user identity. Because the PoC gateway assigns IMS user identities to terminals without an IMS user identity, terminals without an IMS user identity can also use the PoC service. With this method, the application of the PoC service will be broadened.

Step 303: The PoC gateway assigns an IMS user identity to the first terminal.

The PoC gateway assigns a temporary IMS user identity to the first terminal and continues with step 304.

Step 304: The PoC gateway sends a registration request to an IMS core.

The PoC gateway sends a registration request to the IMS core with the IMS user identity carried in the session setup request originated by the first terminal or the assigned IMS user identity. The IMS core provides a registration address for the IMS user identity requesting registration to assure that the IMS user identity is usable. The registration address of the IMS user identity will exist in the IMS core during the entire PoC service process and a certain surviving period after end of the call. The surviving period after end of the call is set in the IMS core. Those skilled in the art can set the period according to actual conditions and usually, it is usually set to 24 hours.

Step 305: The IMS core sends a registration success response to the PoC gateway.

The IMS core returns a registration success response to the PoC gateway after assigning a registration address for the IMS user identity sent by the PoC gateway.

Step 306: The PoC gateway performs protocol adaptation and sends a session setup request to a PoC server via the IMS core.

When the first terminal requesting the PoC service is an IMS terminal, the PoC gateway need not perform protocol adaptation but sends the session setup request to the PoC server via the IMS core. When the first terminal requesting the PoC service is a non-IMS terminal, the session setup request originated by the first terminal is not based on SIP and the PoC gateway performs protocol adaptation for the session setup request. Particularly, the PoC gateway converts the session setup request originated by the first terminal into a SIP request and sends a SIP based session setup request to the PoC server via the IMS core; the session setup request carries numbers of the first terminal and the second terminal. The number of the first terminal is its IMS user identity or the temporary IMS user identity assigned by the PoC gateway. The PoC gateway sends the session setup request to the IMS core and the IMS core forwards the session setup request to the PoC server. Because the PoC gateway performs protocol adaptation on session setup requests originated by non-IMS terminals, it is convenient for terminals of various access modes to get access to the PoC service.

Step 307: The PoC server sends a session setup success response to the PoC gateway via the IMS core.

Upon reception of the session setup request from the IMS core, the PoC server delivers the session setup request to the second terminal. After the second terminal agrees to accept the session setup request, the PoC server returns a session setup success response to the IMS core and the IMS core forwards the session setup success response to the PoC gateway. Upon reception of the session setup success response from the PoC server, the PoC gateway responds to the first terminal with a call result indicating that the callee is successfully connected.

Now, a PoC service connection is set up between the first terminal and the second terminal, and the first terminal and the second terminal can start a voice conversation or other data exchange.

After a session is successfully set up, the first terminal and the second terminal start information interaction. If the first terminal is a non-IMS terminal, such as a web terminal, the first terminal sends a TCP based media stream to the PoC gateway; the PoC gateway converts the TCP media stream into an RTP/RTCP based media stream and sends the converted media stream to the second terminal; the second terminal sends an RTP/RTCP based media stream to the first terminal; the PoC gateway converts the RTP/RTCP based media stream into a TCP based media stream and delivers the converted media stream to the first terminal. In a word, the PoC gateway converts the format of media streams so that a media stream from the first terminal is converted into a media stream receivable to the second terminal and a media stream from the second terminal is converted into a media stream receivable to the first terminal. Information interaction between the first terminal and second terminal is thus achieved. For example, when a fixed line terminal accesses a PoC service, the PoC gateway converts the media format supported by the fixed line into an RTP/RTCP based media stream and converts an RTP/RTCP based media stream into a media format supported by the fixed line.

During the entire process from start of the session to end of the session, the PoC gateway records the originating terminal number, number of the called terminal, and the start time and end time of the session so that it is convenient to search history call records and perform charging on the PoC gateway accordingly.

As mentioned above, the registration address of the IMS user identity will survive in the IMS core for a certain period, during which, the PoC gateway stores the connection mapped to the IMS user identity. When the second terminal in the above process originates a PoC call to the first terminal, the following process applies.

An embodiment of the present disclosure provides a method for implementing the PoC service where the second terminal calls the first terminal within a certain surviving period.

Figure 4:
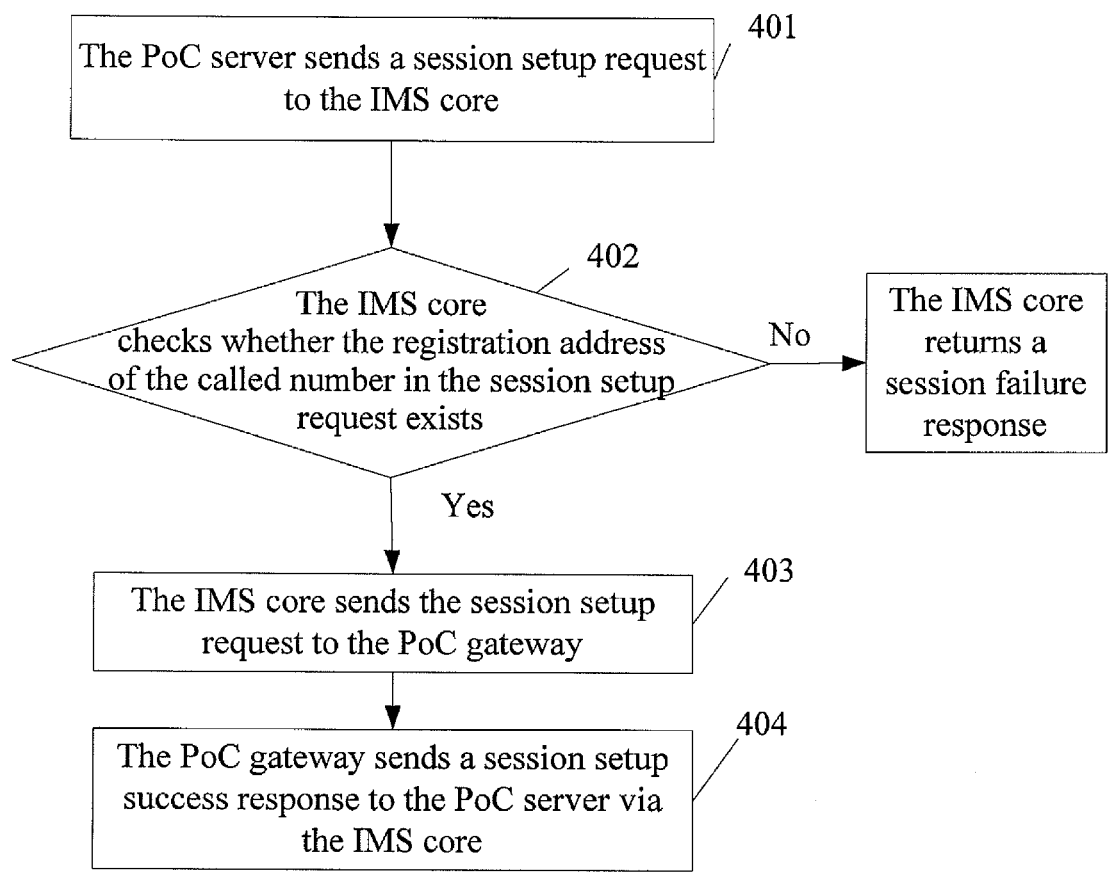
FIG. 4 shows a method for implementing the PoC service where a second terminal calls a first terminal within a certain surviving period according to an embodiment of the present disclosure.

FIG. 4 shows the method for implementing the PoC service where the second terminal calls the first terminal within a certain surviving period in the embodiment of the present disclosure.

The PoC gateway stores the connection mapped to the IMS user identity for a certain surviving period and the registration address of the IMS user identity will also survive in the IMS core for a certain period. The surviving time of the connection in the PoC gateway equals the surviving time of the registration address in the IMS core, usually, 24 hours. Therefore, when the first terminal calls the second terminal, the first terminal number displayed on the second terminal will be valid for 24 hours; when the second terminal calls the first terminal, the second terminal calls the first terminal number displayed on the second terminal and the call is delivered on the previously established connection. If the second terminal calls the first terminal after the surviving period expires, the call will be rejected by the IMS core and a failure response will be returned; if the call is originated within the surviving time, but the first terminal is shut down or deregisters on the PoC service page, the call will not succeed either.

Step 401: The PoC server sends a session setup request to the IMS core.

The session setup request carries the numbers of the first terminal and the second terminal, where the first terminal number is the IMS user identity previously registered by the first terminal or the temporary IMS user identity assigned by the PoC gateway.

Step 402: The IMS core checks whether a registration address of the called number (the first terminal number) carried in the session setup request exists.

Upon reception of the session setup request from the PoC server, the IMS core checks whether the registration address of the called number (the first terminal number) in the session setup request exists. If the IMS core does not find a previous registration address of the first terminal in the IMS core, the IMS core discards the received session setup request and returns a failure response to the PoC server and the PoC server forwards the failure response to the second terminal; if the IMS core finds the appropriate registration address, the process goes to step 403.

Step 403: The IMS core sends the session setup request to the PoC gateway.

Upon reception of the session setup request from the IMS core, the PoC gateway checks whether the IMS user identity of the first terminal in the request exists in the PoC gateway. If the IMS user identity exists, a previous connection between the PoC gateway and the first terminal exists and the PoC delivers the session setup request to the first terminal via the previous connection; if the IMS user identity is not found, the PoC gateway discards the call. After the first terminal receives the session setup request and agrees to accept the request, the process goes to step 404.

Step 404: The PoC gateway sends a session setup success response to the PoC server via the IMS core.

After the first terminal agrees to accept the session setup request, the PoC gateway sends a session success response to the IMS core and the IMS core forwards the success response to the PoC server.

After a session is set up between the first terminal and the PoC server, the second terminal exchanges data with the first terminal. The PoC gateway converts the format of media streams so that a media stream from the second terminal is converted into a media stream receivable to the first terminal and a media stream from the first terminal is converted into a media stream receivable to the second terminal. In the embodiment of the present disclosure, the access terminal is a web terminal and the gateway converts an RTP/RTCP based media stream into a TCP based media stream. When the first terminal sends a media stream to the second terminal, the PoC gateway converts the TCP based media stream into an RTP/RTCP based media stream. With this method, bidirectional PoC communications are achieved.

During the entire process from start of the session to end of the session, the PoC gateway records the originating terminal number, number of the called terminal, and the start time and end time of the session so that it is convenient to search history call records and perform charging on the PoC gateway accordingly.

Figure 5:
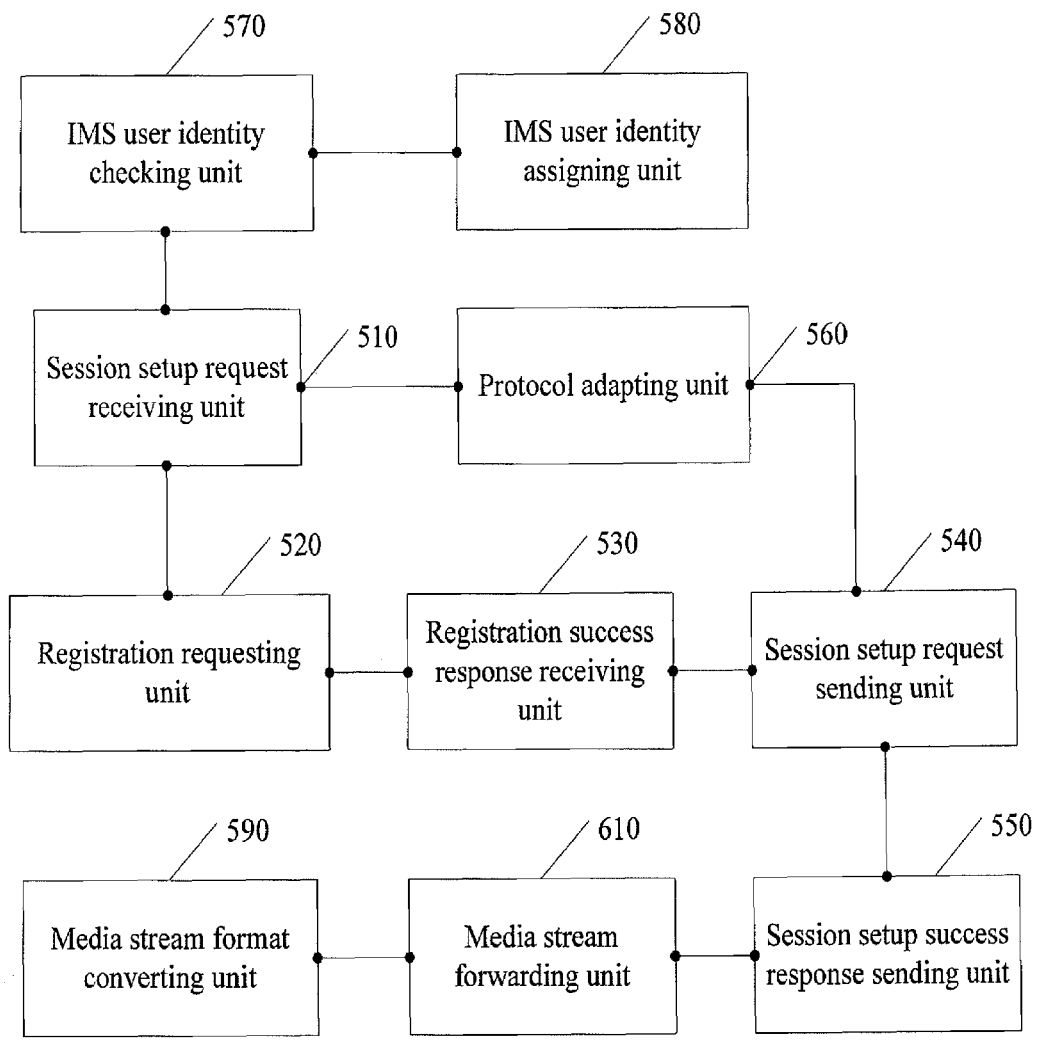
FIG. 5 shows a structure of a PoC gateway according to an embodiment of the present disclosure.

FIG. 5 shows the structure of a PoC gateway provided according to an embodiment of the present disclosure.

As shown in FIG. 5, the PoC gateway includes:

a session setup request receiving unit 510, configured to receive a request originated by a first terminal for setup of a session with a second terminal;

a registration requesting unit 520, configured to send a registration request to an IMS core with an IMS user identity after the session setup request receiving unit 510 receives the session setup request;

a registration success response receiving unit 530, configured to receive a registration success response from the IMS core;

a session setup request sending unit 540, configured to forward the session setup request to a PoC server via the IMS core after the registration success response receiving unit 530 receives the registration success response from the IMS core; and a session setup success response sending unit 550, configured to send a session setup success response from the PoC server via the IMS core to the first terminal after the session setup request sending unit 540 forwards the session setup request to the PoC server via the IMS core.

When the first terminal that originates the session setup request is a non-IMS terminal, the PoC gateway further includes a protocol adapting unit 560, configured to perform protocol adaptation on the session setup request after the session setup request receiving unit receives the session setup request.

The session setup request sending unit 540 sends the adapted session setup request to the PoC server via the IMS core.

To ensure that a terminal without an IMS user identity can use the PoC service, the PoC gateway further includes:

an IMS user identity checking unit 570, configured to check whether the first terminal that logs in is an IMS user;

an IMS user identity assigning unit 580, configured to assign an IMS user identity to the first terminal when the first terminal is not an IMS user; and the registration requesting unit 520, configured to originate a registration request to the IMS core with the assigned IMS user identity.

After a session is set up, the first terminal exchanges media streams with the second terminal and the PoC gateway further includes:

a media stream format converting unit 590, configured to convert the format of a media stream sent by the first terminal and convert the format of a media stream sent by the second terminal; and a media stream forwarding unit 610, configured to forward the converted media stream sent by the first terminal to the second terminal via the IMS core and forward the converted media stream sent by the second terminal to the first terminal.

In the embodiments of the present disclosure, when the PoC server receives a PoC service request from another terminal, the PoC server sends a session request to the called terminal via the PoC gateway, so that terminals of various access modes can terminate a PoC service call and a bidirectional PoC service can be achieved between terminals of various access modes.

Detailed above are a method for implementing the PoC service and a PoC gateway in exemplary embodiments of the present disclosure. It is apparent that those skilled in the art can make various modifications and variations to the disclosure without departing from the spirit and scope of the disclosure. The disclosure is intended to cover these modifications and variations provided that they fall in the scope of protection defined by the following claims or their equivalents.

What is claimed is:

1. A method for implementing the Push to talk over Cellular (PoC) service, comprising:
    receiving, by a PoC gateway, a session setup request from a first terminal for setup of a session with a second terminal;
    sending, by the PoC gateway, a registration request to an IP Multimedia Subsystem (IMS) core after receiving the session setup request from the first terminal;
    sending, by the PoC gateway, the session setup request via the IMS core to a PoC server after receiving a registration success response returned by the IMS core, so as to forward the session setup request to the second terminal via the PoC server;
    receiving, by the PoC gateway, a session setup success response from the second terminal via the PoC server; and
    sending, by the PoC gateway, the session setup success response to the first terminal.

2. The method according to claim 1, after the PoC gateway receives the session setup request from a first terminal for setup of a session with a second terminal, further comprising:
    performing, by the PoC gateway, protocol adaptation on the session setup request, and
    sending, by the PoC gateway, adapted session setup request to the PoC server via the IMS core.

3. The method according to claim 2, wherein before the PoC gateway receives the session setup request from a first terminal for setup of a session with a second terminal, the method further comprises:
    setting up, by the PoC gateway, a connection with the first terminal, which logs in the PoC gateway; and
    assigning, by the PoC gateway, an IMS user identity to the first terminal, if the first terminal logs in the PoC gateway with a non-IMS user identity, so that the first terminal sends the session setup request with the second terminal by the assigned IMS user identity.

4. The method according to claim 3, further comprising:
    receiving, by the PoC gateway, media streams from the first terminal after the first terminal receives the session setup success response;
    sending, by the PoC gateway, the media streams to the PoC server according to the IMS core so that the PoC server sends the media streams to the second terminal;
    receiving, by the PoC gateway, media streams which are sent from the second terminal to the first terminal and sent by the PoC server to the PoC gateway according to the IMS core; and
    sending, by the PoC gateway, the media streams sent from the second terminal to the first terminal.

5. The method according to claim 4, further comprising:
    converting, by the PoC gateway, the media stream sent by the first terminal; and
    sending, by the PoC gateway, the converted media stream to the PoC server according to IMS core.

6. The method according to claim 5, further comprising:
    converting, by the PoC gateway, the media stream send by the second terminal, and
    sending, by the PoC gateway, the converted media stream to the first terminal.

7. The method according to claim 6, further comprising:
    recording, by the PoC gateway, the first terminal number, the second terminal number, and the start time and end time of the session after the first terminal receives the session setup success response; and
    charging, by the PoC gateway, the session according to the first terminal number, the second terminal number, and the start time and end time of the session.

8. The method according to claim 2, wherein after the PoC gateway receives the session setup request from the first terminal, the method further comprises:
    checking, by the PoC gateway, whether the first terminal is an IMS user;
    assigning, by the PoC gateway, a IMS user identity to the first terminal, if the first terminal logs in the PoC gateway with a non-IMS user identity; and
    sending, by the PoC gateway, the registration request to the IMS core according to the IMS user identity.

9. A PoC gateway, comprising:
    a session setup request receiving unit, configured to receive a request from a first terminal for setup of a session with a second terminal;
    a registration requesting unit, configured to send a registration request to an IMS core with an IMS user identity after the session setup request receiving unit receives the session setup request;
    a registration success response receiving unit, configured to receive a registration success response returned by the IMS core;
    a session setup request sending unit, configured to send the session setup request to a PoC server after the registration success response receiving unit receives the registration response from the IMS core; and
    a session setup success response sending unit, configured to send a session setup success response sent by the PoC server via the IMS core to the first terminal after the session setup request sending unit sends the session setup request to the PoC server via the IMS core.

10. The PoC gateway according to claim 9, further comprising:
a protocol adapting unit, configured to perform protocol adaptation on the session setup request after the session setup request receiving unit receives the session setup request, wherein the session setup request sending unit is correspondingly configured to send the adapted session setup request to the PoC server via the IMS core.

11. The PoC gateway according to claim 10, further comprising:
an IMS user identity checking unit, configured to check whether the first terminal that logs in is an IMS user;
an IMS user identity assigning unit, configured to assign an IMS user identity to the first terminal when the first terminal is not an IMS user;
and the registration requesting unit is correspondingly configured to originate a registration request to the IMS core with the assigned IMS user identity.

12. The PoC gateway according to claim 11, further comprising:
a media stream format converting unit, configured to convert the format of a media stream sent by the first terminal; and
a media stream forwarding unit, configured to forward the converted media stream sent by the first terminal to the second terminal via the IMS core.

13. The PoC gateway according to claim 12, wherein the media stream format converting unit is further configured to convert the format of a media stream sent by the second terminal, and the media stream forwarding unit is correspondingly configured to forward the converted media stream sent by the second terminal to the first terminal.

* * * * *